Feb. 2, 1960            R. RESNICK            2,923,070
STREET INDEX DEVICE FOR POSTAL CLERKS
Filed Feb. 6, 1958            2 Sheets-Sheet 1
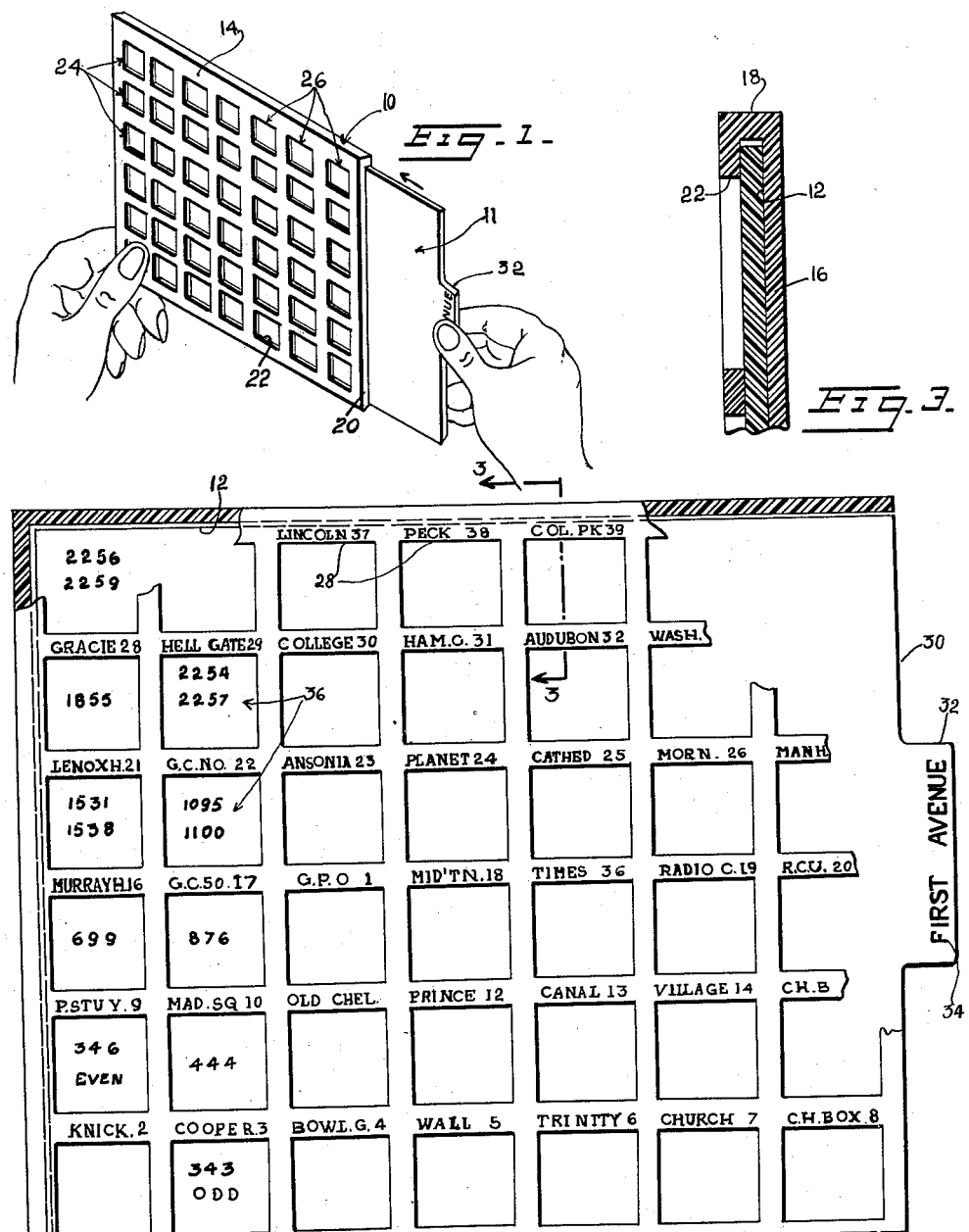
INVENTOR.
ROBERT RESNICK
BY
ATTORNEY Feb. 2, 1960    R. RESNICK    2,923,070
STREET INDEX DEVICE FOR POSTAL CLERKS
Filed Feb. 6, 1958    2 Sheets-Sheet 2
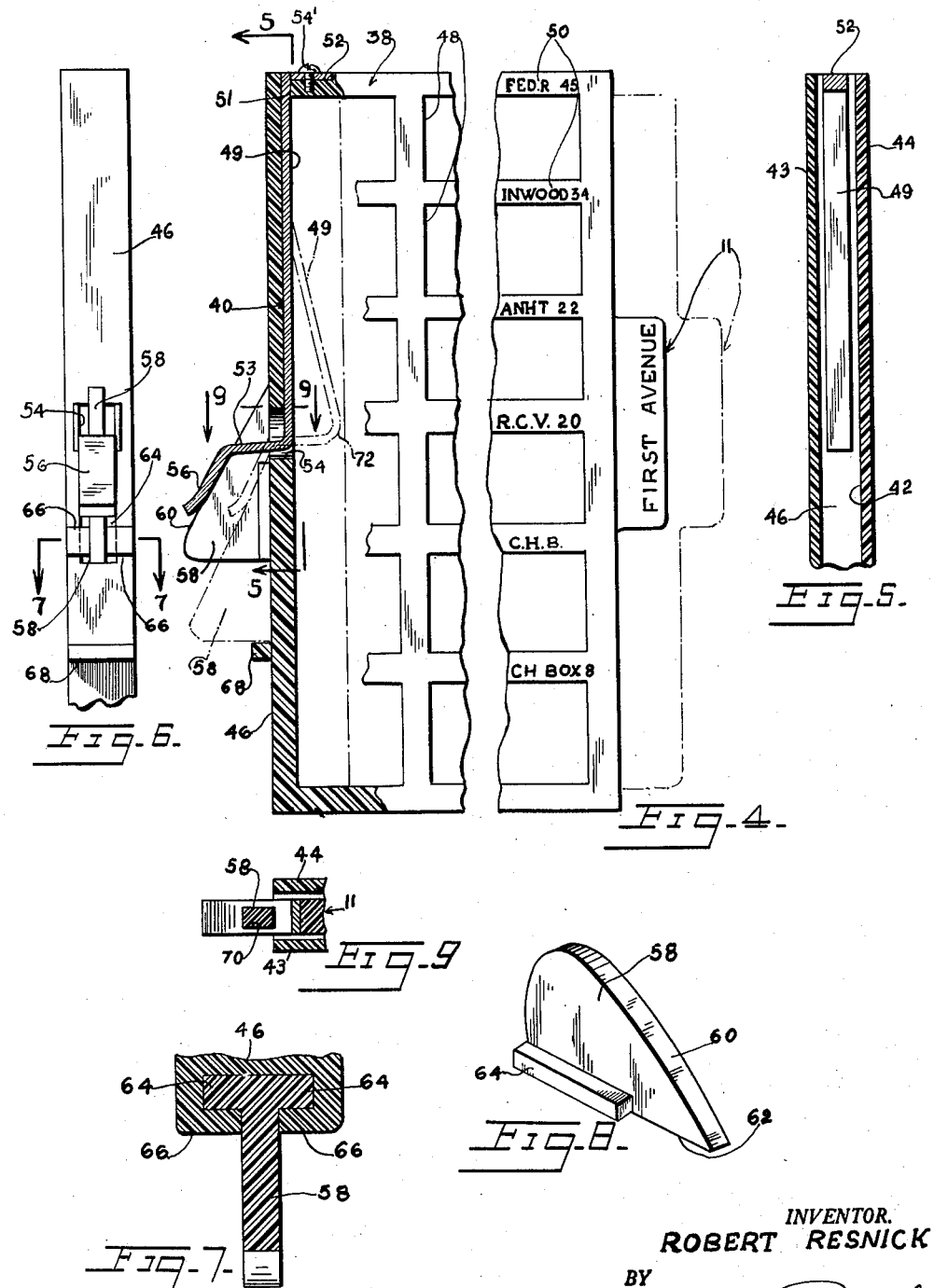
INVENTOR.
ROBERT RESNICK
BY
ATTORNEY

2,923,070

Patented Feb. 2, 1960

2,923,070
STREET INDEX DEVICE FOR POSTAL CLERKS
Robert Resnick, Bronx, N.Y.

Application February 6, 1958, Serial No. 713,678

4 Claims. (Cl. 35—75)

This invention relates generally to training aids, and more particularly has reference to a visual aid adapted for use in the training of postal clerks, and so designed that in said training, one can swiftly and easily test his knowledge as to the particular branch post office to which a letter should be transmitted for delivery.

Although hereinafter the invention will be described with particular reference to its use as a training aid, it will be understood that the invention could, if desired, be employed for use in the regular performance of the duties of a postal clerk. When used in the manner last mentioned, the device can be employed for permitting a swift determination as to the branch post office, that is, the postal zone, to which a letter should be sent for its ultimate delivery, in the event said zone is not specified on the letter and is not known immediately by the particular clerk handling the same.

Another object is to provide a device of the character stated which will be adapted to be manufactured at a very low cost, so that a large number of the devices can be used, as for example one device for each student in a postal clerk training class.

Another object is to provide a device of the character stated which will include a holder showing all the postal zones and the branch post offices represented by said zones, and which will further include a set of inserts, one for each street to which a letter might be addressed, said inserts being selectively insertable and removable in the holder in such a manner that one can immediately determine the postal zone in which a particular address or street number falls.

Another object is to provide a device of the character stated which, in one form of the invention, will include means for partially ejecting the insert, to facilitate its extraction, or to remove the same instantaneously from its operative position, in the event the postal clerk who is being trained is being timed with respect to determining the postal zone in which a particular letter is properly classified.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a visual training aid according to the present invention.

Fig. 2 is an enlarged front elevational view thereof, partly broken away.

Fig. 3 is a still further enlarged, detail transverse sectional view substantially on line 3—3 of Fig. 2.

Fig. 4 is a view on the same scale as Fig. 2, showing a modified form, a portion being broken away and another portion being shown in section, the insert being shown in full and dotted lines in its fully inserted and in a partially ejected position, respectively.

Fig. 5 is a transverse sectional view on the same scale as Fig. 4, taken substantially on line 5—5 of Fig. 4.

Fig. 6 is a fragmentary end elevational view of the modified form, as seen from the left of Fig. 4.

Fig. 7 is a detail sectional view, the scale being enlarged above that of Fig. 6, taken on line 7—7 of Fig. 6.

Fig. 8 is a perspective view of a slidable cam embodied in the modification shown in Fig. 4, per se.

Fig. 9 is a detail sectional view, on the same scale as Fig. 4, taken substantially on line 9—9 of Fig. 4, the guides being omitted.

Referring to the drawings in detail, in the form of the device shown in Figs. 1–3, the device constitutes two main components, a slide holder or envelope generally designated 10, and a slide or insert generally designated 11.

The material of which the device is made can, of course, be varied as desired, and the device could be made of cardboard, paper, or the like. In a more permanent form, however, the device may constitute a plastic article, with both the holder and the insert being formed of plastic. This is the arrangement shown in the drawings by way of illustration, but, of course, it is not to be considered as necessarily restrictive of the materials that could be advantageously employed.

In any event, the holder 10 is of flat, sheet-like form, and is of rectangular outer configuration, having over substantially its entire area a pocket 12 into which the insert 11 is slidably moved during use of the device. In other words, the holder 10 may appropriately be considered as comprising a flat front wall 14, and a flat back wall 16, the front and back walls being disposed in closely spaced, parallel planes to define therebetween the pocket 12, and being connected along three sides by a peripheral or connecting wall 18.

The fourth side 20 of the device is left open, to provide an open end on the pocket through which the insert 11 is moved.

Formed in the front wall 14 are rectangular windows or sight openings 22. These are of rectangular configuration in the illustrated example, although the shape is by no means critical to successful operation of the invention. It is sufficient to note, for the purposes of the present application, that the sight openings 22 would be disposed over substantially the full area of the front wall, and communicate with the pocket 12. The sight openings are arranged in rows, the rows intersecting, so that it may be appropriately considered that there are horizontal rows 24 intersecting perpendicularly with vertical rows 26.

Above each sight opening there is provided a printed legend 28 (Fig. 2). This legend designates the particular post office.

As will be noted from Fig. 2, in the typical example given, each postal zone, that is, each distributing post office, for an entire city or portion of a city is represented on the surface of the front wall. In the illustrated example, post offices that are in the Borough of Manhattan, New York city, are shown and from the standpoint of their zone numbers, ascend in value, starting with the lowermost row, at the left-hand end of said lowermost horizontal row 24.

Referring now to the insert 11, this is merely a flat, rectangular sheet designed to fit snugly in pocket 12. This may be of a flexible material, or alternatively it might be formed of sheet plastic, to permit use of the same for a long period of time. The insert includes a rectangular body portion 30, integrally formed at one end with a tab 32 that constitutes a handle (see Fig. 1). On the tab 32 there is provided a legend 34 indicating a particular street.

At various locations upon the body portion 30 there are printed various street numbers. At each of these locations, designated at 36 in Fig. 2, there is provided a range of street numbers, and the indicia at the locations 36 are observed through the various windows or sight openings when the insert 30 is engaged to its maximum extent in the pocket.

By reason of the arrangement illustrated and described, it may be observed that assuming that one were given the task of determining the appropriate post office branch that would handle the delivery of a particular letter, one might decide that the letter, addressed for example to 699 First Avenue, should go to the post office branch designated "Murray Hill 16." Therefore, on moving of the insert into its Fig. 2 position, it is to be noted that one sees the number 699 through the sight opening designated "Murray Hill 16." This means that this post office branch handles the delivery of this particular letter.

The device can, of course, be used not only for training postal clerks, but could be used as an aid by a clerk, as for example a substitute clerk sorting mail and directing it to a particular post office branch that is charged with the delivery thereof. If a problem is encountered as to the branch that would handle a particular piece of mail, one merely selects the appropriate insert, and extends it into the holder to determine the zone.

In Figs. 4–9 there is shown a modified construction including a holder generally designated 38 adapted to receive the insert 11. The holder 38 is similar to the holder 10, except for having a means 40 for partially ejecting the insert, when the same has served its purpose. Further, in this form the holder may be of greater width, that is, the pocket 42 thereof (Fig. 5) may be slightly wider than the pocket 12 of the first form. The insert 11, of course, can also be of greater width than the insert shown in Fig. 1, so as to snugly engage in the pocket.

The holder 38 includes a front wall 43 and a back wall 44, as well as a peripheral connecting wall 46. Windows or sight openings 48 are provided in the device, and adjacent each window is a legend 50, identical to the legends 28 of the first form of the invention.

In the arrangement shown in Figs. 4–9, one can partially eject the insert, in a sudden movement which may be caused to occur at the end of a predetermined time interval during a training period. In other words, it may be desired to permit the student to observe the insert through the sight openings for no more than a predetermined period of time. At the end of that time, the insert is to be instantaneously offset in respect to its assigned position relative to the sight openings.

Alternatively, it may simply be desired to partially eject the insert to facilitate its full extraction.

In this form of the invention there is provided a leaf spring member 49, one end of which extends through a slot 51 formed in the wall 46. A lateral extension 52 is provided upon this end of the member 49, and is secured by a screw or equivalent fastening means 54' to the holder.

The spring member 49 extends in contact with the wall 46, at the closed end of the pocket 42, and is so tensioned that it normally tends to spring outwardly to the dotted line position shown in Fig. 4. At its distal end, the member 49 has an extension 53 projecting outwardly through an aperture 54 formed in wall 46. Extension 53 terminates at its free end in an obliquely extending lip or finger 56 disposed exteriorly of the pocket.

A slide 58 (Fig. 8) has a sloped cam surface 60 disposed obliquely to the length of the spring member 49, substantially parallel to the finger 56.

The slide 58 also has a bottom edge 62, and integrally formed upon opposite side surfaces or faces of the slide 58 are guide ribs 64. These engage under and are slidably retained by confronting, angular guides 66 integrally formed upon the outer surface of the wall 46.

Thus, the slide 58 is mounted to slide upon the wall 46 between the full and dotted line positions shown in Fig. 4. Limiting movement of the slide 58 beyond the dotted line positions is a transverse abutment 68 integrally formed upon the wall 46.

The pointed nose of the slide extends through an opening 70 (Fig. 9) formed in the extension 53 of the spring.

By reason of this arrangement, and assuming that the spring is in its dotted line position of Fig. 4 with the slide 58 retracted, one need merely shift the slide 58 upwardly. The pointed end enters the opening 70, and a cam action immediately occurs, wherein the sloped surface 60 cammingly biases the fingers 56 outwardly of the holder from the dotted line to the full line position of the finger shown in Fig. 4. As a result, the interiorly disposed body portion of the member 49 is shifted from the dotted to the full line position shown in Fig. 4, so as to permit the insert 11 to be moved to its fully inserted position shown in full lines in Fig. 4.

When it is desired to cause a sudden, partial ejection of the insert, sufficient to offset the legends 36 thereof in respect to the side openings 22, one moves the button or slide 58 to the retracted position shown in dotted lines. The spring immediately flexes to the dotted line position, and exerts pressure against the insert 11, at the location 72, where the body portion of the member 49 merges into the extension 53.

Apart from the above, of course, the device is identical to that shown in Figs. 1–3, and is used in the same manner as the first form of the invention.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A device for determining the post office to which a piece of mail should be sent for delivery to the addressee, comprising a rectangular holder having spaced front and rear walls and a peripheral wall extending around three sides of said walls leaving one side open, the space between said walls constituting a pocket opening into the open side of the holder, the front wall of the holder having a plurality of sight openings and having indicia adjacent the several openings designating different post offices, said peripheral wall having an opening therein, and an insert removably engageable in said pocket, said insert including a main indicium designating a street and auxiliary indicia designating street numbers, said auxiliary indicia being visible through said sight openings, said holder including means for partially ejecting the insert from the pocket, said ejecting means comprising a spring mounted in the closed end of the pocket opposite the open end thereof, and bearing against the insert, said spring having a portion extending through the opening in the peripheral wall to the outside thereof and terminating remotely from said wall, said spring being under tension adapted for shifting the insert partially out of the pocket, and a detent mounted upon the holder and adapted for engaging the spring releasably against deflection to a position in which the spring biases the insert partially out of the pocket, said detent being in the form of a cam slidably mounted upon the outside of the peripheral wall of the holder and having a sloped cam surface engaging the spring, the spring having a correspondingly sloped surface on its outer remote end aligned with the sloped surface on the cam for shifting the spring to a retracted position responsive to sliding movement of the cam in one direction upon the holder.

2. A device for determining the post office to which a piece of mail should be sent for delivery to the addressee, comprising a rectangular holder having spaced front and rear walls and a peripheral wall extending around three sides of said walls leaving one side open, the space between said walls constituting a pocket opening into the open side of the holder, the front wall of the holder having a plurality of sight openings and having indicia adjacent the several openings designating different post offices, said peripheral wall having an opening therein, and an insert removably engageable in said pocket, said insert including a main indicium designating a street and auxiliary indicia designating street numbers, said auxiliary indicia being visible through said sight openings, said holder including means for partially ejecting the insert from the pocket, said ejecting means comprising a spring mounted in the closed end of the pocket opposite the open end thereof, and bearing against the insert, said spring having a portion extending through the opening in the peripheral wall to the outside thereof and terminating remotely from said wall, said spring being under tension adapted for shifting the insert partially out of the pocket, and a detent mounted upon the holder and adapted for engaging the spring releasably against deflection to a position in which the spring biases the insert partially out of the pocket, said detent being in the form of a cam slidably mounted upon the outside of the peripheral wall of the holder and having a sloped cam surface engaging the spring, the spring having a correspondingly sloped surface on its outer remote end aligned with the sloped surface on the cam for shifting the spring to a retracted position responsive to sliding movement of the cam in one direction upon the holder, the holder including an abutment limiting sliding movement of the cam in an opposite direction, said cam when moved in an opposite direction freeing the spring for deflection to an insert-ejecting position.

3. A device for determining the post office to which a piece of mail should be sent for delivery to the addressee, comprising a rectangular holder having spaced front and rear walls and a peripheral wall extending around three sides of said walls leaving one side open, the space between said walls constituting a pocket opening into the open side of the holder, the front wall of the holder having a plurality of sight openings and having indicia adjacent the several openings designating different post offices, said peripheral wall having an opening therein, and an insert removably engageable in said pocket, said insert including a main indicium designating a street and auxiliary indicia designating street numbers, said auxiliary indicia being visible through said sight openings, said holder including means for partially ejecting the insert from the pocket, said ejecting means comprising a spring mounted in the closed end of the pocket opposite the open end thereof, and bearing against the insert, said spring having a portion extending through the opening in the peripheral wall to the outside thereof and terminating remotely from said wall, said spring being under tension adapted for shifting the insert partially out of the pocket, and a detent mounted upon the holder and adapted for engaging the spring releasably against deflection to a position in which the spring biases the insert partially out of the pocket, said detent being in the form of a cam slidably mounted upon the outside of the peripheral wall of the holder and having a sloped cam surface engaging the spring, the spring having a correspondingly sloped surface on its outer remote end aligned with the sloped surface on the cam for shifting the spring to a retracted position responsive to sliding movement of the cam in one direction upon the holder, the holder including an abutment limiting sliding movement of the cam in an opposite direction, said cam when moved in an opposite direction freeing the spring for deflection to an insert-ejecting position, the holder including guides with which the cam is slidably engaged.

4. A device for determining the post office to which a piece of mail should be sent for delivery to the addressee, comprising a rectangular holder having spaced front and rear walls and a peripheral wall extending around three sides of said walls leaving one side open, the space between said walls constituting a pocket opening into the open side of the holder, the front wall of the holder having a plurality of sight openings and having indicia adjacent the several openings designating different post offices, said peripheral wall having an opening therein, and an insert removably engageable in said pocket, said insert including a main indicium designating a street and auxiliary indicia designating street numbers, said auxiliary indicia being visible through said sight openings, said holder including means for partially ejecting the insert from the pocket, said ejecting means comprising a spring mounted in the closed end of the pocket opposite the open end thereof, and bearing against the insert, said spring being under tension adapted for shifting the insert partially out of the pocket, and a detent mounted upon the holder and adapted for engaging the spring releasably against deflection to a position in which the spring biases the insert partially out of the pocket, said detent being in the form of a cam slidably mounted upon the outside of the peripheral wall of the holder and having a sloped cam surface engaging the spring, the spring having a correspondingly sloped surface aligned with the sloped surface on the cam for shifting the spring to a retracted position responsive to sliding movement of the cam in one direction upon the holder, the holder including an abutment limiting sliding movement of the cam in an opposite direction, said cam when moved in an opposite direction freeing the spring for deflection to an insert-ejecting position, the holder including guides with which the cam is slidably engaged, the spring being of the leaf type and including a free end projecting exteriorly of the holder through said opening, said free end having said sloped cam surface of the spring.

References Cited in the file of this patent

UNITED STATES PATENTS

| | | |
|---|---|---|
| 588,254 | Walker | Aug. 17, 1897 |
| 1,599,039 | Carter | Sept. 7, 1926 |
| 1,781,047 | Bondeson | Nov. 11, 1930 |
| 1,892,318 | Pressey | Dec. 27, 1932 |
| 2,503,130 | Poritz | Apr. 4, 1950 |